(12) United States Patent
Chiba et al.

(10) Patent No.: US 6,456,731 B1
(45) Date of Patent: Sep. 24, 2002

(54) OPTICAL FLOW ESTIMATION METHOD AND IMAGE SYNTHESIS METHOD

(75) Inventors: Naoki Chiba, Higashiosaka (JP); Takeo Kanade, Pittsburgh, PA (US); Hiroshi Kano, Kyotanabe (JP)

(73) Assignees: Sanyo Electric Co., Ltd., Osaka (JP); $K^2T$, Inc., Duquesne, PA (US)

( * ) Notice: Subject to any disclaimer, the term of this patent is extended or adjusted under 35 U.S.C. 154(b) by 0 days.

(21) Appl. No.: 09/410,060

(22) Filed: Oct. 1, 1999

Related U.S. Application Data

(63) Continuation-in-part of application No. 09/081,862, filed on May 21, 1998.

(51) Int. Cl.$^7$ .............................. G06K 9/00; G06K 9/36
(52) U.S. Cl. ...................................... 382/107; 382/284
(58) Field of Search ................................ 382/107, 284, 382/287; 342/115, 435

(56) References Cited

U.S. PATENT DOCUMENTS

| | | | |
|---|---|---|---|
| 5,936,671 A | * | 8/1999 | Van Beek et al. .......... 348/413 |
| 5,987,164 A | * | 11/1999 | Szeliski et al. ............. 382/154 |
| 5,991,444 A | * | 11/1999 | Burt et al. ................... 382/232 |
| 6,002,794 A | * | 12/1999 | Bonneau et al. ............ 382/166 |
| 6,008,865 A | * | 12/1999 | Fogel ......................... 348/700 |
| 6,011,558 A | * | 1/2000 | Hsich et al. ................. 345/435 |
| 6,018,349 A | * | 1/2000 | Szeliski et al. ............. 345/425 |
| 6,097,854 A | * | 8/2000 | Szeliski et al. ............. 382/284 |
| 6,157,747 A | * | 12/2000 | Szeliski et al. ............. 382/284 |

OTHER PUBLICATIONS

Nielson, G. M., Scattered data modeling, IEEE Computer Graphics and Applications, pp. 60–70, Jan. 1993.*

Rousso, B. et al., Universal mosaicing using pipe projection, Sixth International Conference on Computer Vision, Jan. 1998.*

* cited by examiner

*Primary Examiner*—Joseph Mancuso
*Assistant Examiner*—Martin Miller
(74) *Attorney, Agent, or Firm*—Arent Fox Kintner Plotkin & Kahn, PLLC

(57) ABSTRACT

Optical flow is calculated for each patch on the basis of two images, and then a region having low confidence and a region having high confidence are separated depending on confidence of the optical flow, and the optical flow in the region having low confidence is interpolated using the optical flow in its surrounding regions.

39 Claims, 10 Drawing Sheets

OPTICAL FLOW ESTIMATION METHOD AND IMAGE SYNTHESIS METHOD

This application is a continuation-in-part application of application Ser. No. 09/081,862 filed May 21, 1998 which is hereby incorporated by reference in its entirety.

BACKGROUND OF THE INVENTION

1. Field of the Invention

The present invention relates to an optical flow estimation method, an image synthesis method, an image synthesizer, a recording medium on which an image synthesis program is recorded, a digital camera, and a printer.

2. Description of the Prior Art

A technique for calculating optical flow from two images, and registering the two images on the basis of the obtained optical flow has been known. Description is now made of a conventional method of calculating optical flow.

(1) Lucas-Kanade Method

A large number of methods of calculating apparent optical flow of a moving object in a moving image have been conventionally proposed. The Lucas-Kanade method which is a local gradient method out of the methods is one of the best methods. The reason for this is that the speed of processing is high, implementing is easy, and the result has confidence.

As for the details of the Lucas-Kanade method, see an article: B. Lucas and T. Kanade, "An Iterative Image Registration Technique with an Application to Stereo Vision", In Seventh International Joint Conference on Artificial Intelligence (IJCAI-81), pp.674–979, 1981.

The outline of the Lucas-Kanade method will be described.

When a gray scale pattern $I(x, y, t)$ of image coordinates $p=(x, y)$ at time t is moved to coordinates $(x+\delta x, y+\delta y)$ with its gradation distribution kept constant after a very short time period $(\delta t)$, the following optical flow constraint equation (1) holds:

$$\frac{\partial I}{\partial x}\frac{\delta x}{\delta t} + \frac{\partial I}{\partial y}\frac{\delta y}{\delta t} + \frac{\partial I}{\partial t} = 0 \qquad (1)$$

In order to calculate optical flow $\{(v=(\delta x/\delta t, \delta y/\delta t)=(u, v)\}$ in a two-dimensional image, the number of unknown parameters is two, so that another constraint equation is required. Lucas and Kanade have assumed that optical flow is constant in a local region of an identical object.

Suppose optical flow is constant within a local region $\omega$ on an image, for example. In this case, a squared error E of a gray scale pattern to be minimized can be defined by the following equation (2) when the following substitutions are made:

$I_0(P)=I(x,y,t), I_1(p+v)=I(x+u,y+v,t+\delta t)$ $$E = \sum_\omega [I_1(p+v) - I_0(p)]^2 \qquad (2)$$

When v is very small, the terms of second and higher degrees in Taylor's expansion can be ignored, so that the relationship expressed by the following equation (3) holds:

$I_1(p+v)I_1(p)+g(p)v \qquad (3)$ where $g(p)$ is a linear differential of $I_1(p)$.

The error E is minimized when the derivative of E with respect to v is zero, so that the relationship expressed by the following equation (4) holds:

$$0 = \frac{\partial}{\partial v}E \qquad (4)$$

$$\approx \frac{\partial}{\partial v}\sum_\omega [I_1(p) + g(p)v - I_0(p)]^2$$

$$= \sum_\omega 2g(p)[I_1(p) + g(p)v - I_0(p)]$$

Therefore, the optical flow v is found by the following equation (5):

$$v \approx \frac{\sum_\omega g(p)[I_0(p) - I_1(p)]}{\sum_\omega g(p)^2} \qquad (5)$$

Furthermore, the optical flow can be found with high precision by Newton-Raphson iteration, as expressed by the following equation (6):

$$v_{k+1} = v_k + \frac{\sum g_k[I_0 - I_1^k]}{\sum (g_k)^2} \qquad (6)$$

where $I_1^k = I_1(p+v_k)$, $g_k = g(p+v_k)$, $I_0 = I_0(p)$ (2) Hierarchical Estimation Method The largest problem of the gradient methods, including the Lucas-Kanade method, is that they cannot be applied to large motion because a good initial value is required. Therefore, a method of producing images respectively having resolutions which are different at several levels like a pyramid hierarchical structure to solve the problem has been conventionally proposed.

Images having resolutions which are different at several levels are first previously produced from each of two consecutive images. Approximate optical flow is then calculated between the images having the lowest resolution. More precise optical flow is calculated between the images having a resolution which is higher by one level. The processing is successively repeated until optical flow is calculated between the images having the highest resolution.

FIG. 1d, FIG. 1c, FIG. 1b, and FIG. 1a respectively illustrate an original image, an image having lower resolution than that of the original image shown in FIG. 1d, an image having lower resolution than that of the image having low resolution shown in FIG. 1c, and an image having lower resolution than that of the image having low resolution shown in FIG. 1b. In FIGS. 1a to 1d, S indicates one patch.

The optical flow is gradually found from the image shown in FIG. 1a (an image in a hierarchy 1) the image shown in FIG. 1b (an image in a hierarchy 2), the image shown in FIG. 1c (an image in a hierarchy 3) and the image shown in FIG. 1d (an image in a hierarchy 4) in this order. In FIGS. 1a to 1d, an arrow indicates an optical flow vector found for each patch.

However, the problem is that in a real image, there are few regions containing sufficient texture, so that reliable optical flow is not obtained.

A technique for affixing a plurality of images to one another and synthesizing the images to obtain a seamless image having a wide field of view and having high resolution (image mosaicking) has been conventionally actively studied. Classical applications include synthesis of aerial photographs or satellite photographs. In recent years, a method of synthesizing a plurality of digital images to obtain a seamless panoramic image, constructing a virtual reality environment has been paid attention to.

The following two methods have been known as a technique for obtaining a panoramic image by synthesis.

The first method is a method of translating a camera to previously pick up a plurality of images. The plurality of images obtained are simultaneously displayed on a monitor by a personal computer. A user designates corresponding points between the two images, to synthesize the two images.

In the first method, the motion of the camera is restricted to translation. In the first method, the user must designate the corresponding points.

The second method is a method of fixing a camera to a tripod and restricting the motion of the camera to only rotation on a horizontal surface, to pick up a plurality of images. The plurality of images obtained are projected on a cylindrical surface, to synthesize the images (see U.S. Pat. No. 5,396,583).

In the second method, the motion of the camera must be restricted to only rotation on a horizontal surface. Further, the focal length of the camera must be measured.

SUMMARY OF THE INVENTION

An object of the present invention is to provide an optical flow estimation method in which reliable optical flow is obtained even when an image region is hardly textured.

Another object of the present invention is to provide an image synthesis method, an image synthesizer, and a recording medium on which an image synthesis program is recorded, in which a seamless panoramic image can be obtained from a plurality of images , a camera is allowed to freely moving in order to pick up the plurality of images, and the focal length need not be measured.

Still another object of the present invention is to provide a digital camera or a printer having an image synthesis function capable of obtaining a seamless panoramic image from a plurality of images, allowing a camera to freely moving in order to pick up the plurality of images, and eliminating the necessity of measuring the focal length.

An optical flow estimation method is characterized by being so adapted as to calculate optical flow for each patch on the basis of two images, separate a region having low confidence and a region having high confidence depending on confidence of the optical flow, and interpolate the optical flow in the region having low confidence using the optical flow in its surrounding regions.

Confidence γ is found, upon calculating from a 2×2 matrix of coefficients G in the following equation (7) having as elements the squares of differentials in the vertical and horizontal directions of an image region ω its eigenvalues, by the following equation (8) from the smaller eigenvalue $\lambda_{min}$ and a gray scale residual E between the regions after tracking:

$$G = \sum_{p \in \omega} g(p)g(p)^T \quad (7)$$

$$\gamma = \frac{\lambda_{min}}{E} \quad (8)$$

In an image synthesis method for synthesizing a first image and a second image, a first image synthesis method according to the present invention is characterized by comprising the first step of extracting from the first image a plurality of partial images which are effective for tracking by optical flow between the first image and the second image, as feature points, the second step of tracking a point on the second image corresponding to each of the feature points on the first image, on the basis of the optical flow between the two images, the third step of finding a transformation for finding, on the basis of each of the feature points on the first image and the corresponding point on the second image which is found in the second step, a position on the second image corresponding to each of points on the first image, or a position on the first image corresponding to each of points on the second image, and the fourth step of synthesizing the first image and the second image such that the corresponding points on the first image and the second image coincide with each other on the basis of the obtained transformation.

The first step, for example, comprises the steps of extracting an overlapped portion of the first image and the second image, and extracting from the overlapped portion with the second image, on the first image, a plurality of the partial images which are effective for tracking by the optical flow between the two images, as the feature points.

In the step of extracting the overlapped portion of the first image and the second image, the overlapped portion of the first image and the second image is extracted on the basis of the SSD method, for example.

The second step, for example, comprises the steps of finding the optical flow from the first image and the second image on the basis of an optical flow estimation method using the hierarchically structured Lucas-Kanade method for interpolating optical flow having low confidence out of optical flows obtained in the respective stages of the optical flow estimation method using optical flow in its surrounding regions, and tracking the point on the second image corresponding to each of the feature points on the first image, on the basis of the obtained optical flow.

In an image synthesis method in which from three or more images from a first image to a n-th image (n is an integer of not less than three), the first image and the n-th image are synthesized, with the first image as a reference image, a second image synthesis method according to the present invention is characterized by comprising the first step of finding transformations for finding a position on an i-th image corresponding to each of points on an (i+1)-th image, taking i as each of integers from 1 to (n−1), the second step of finding a transformation for finding a position on the first image corresponding to each of points on the n-th image, on the basis of all of the transformations found in the first step, and the third step of synthesizing the first image and the n-th image such that the corresponding points of the first image and the n-th image coincide with each other, wherein the first step repeats the following steps a to c, by updating i by 1 from i=1 up to i=(n−1):

step a of extracting from the i-th image a plurality of partial images which are effective for tracking by optical flow between the i-th image and the (i+1)-th image, as feature points, step b of tracking a point on the (i+1)-th image corresponding to each of the feature points on the i-th image on the basis of the optical flow between the two images, and step c of finding a transformation for finding a position on the i-th image corresponding to each of points on the (i+1)-th image on the basis of each of the feature points on the i-th image and the corresponding point on the (i+1)-th image found in the step b.

In an image synthesis method for synthesizing three or more images from a first image to a n-th image (n is an integer of not less than three), with the first image as a reference image, a third image synthesis method according to the present invention is characterized by comprising the first step of finding transformations for finding a position on an i-th image corresponding to each of points on an (i+1)-th image, taking i as each of integers from 1 to (n−1), the second step of finding, for each of images from a second image to the n-th image, a transformation for finding a position on the first image corresponding to each of points on each of the second to n-th images, on the basis of the transformations found in the first step, and the third step of performing such processes as synthesizing the first image and the second image on the basis of the transformation for finding the position on the first image corresponding to each of the points on the second image and synthesizing the third image and the synthesized image of the first and second images on the basis of the transformation for finding the position on the first image corresponding to each of the points on the third image, and continuing such processes up until the n-th image and the synthesized image of the first to (n−1)-th images are synthesized on the basis of the transformation for finding the position on the first image corresponding to each of the points on the n-th image, thereby to obtain the synthesized image of the first to n-th images, wherein the first step repeats the following steps a to c, by updating i by 1 from i=1 up to i=(n−1):

step a of extracting from the i-th image a plurality of partial images which are effective for tracking by optical flow between the i-th image and the (i+1)-th image, as feature points;

step b of tracking a point on the (i+1)-th image corresponding to each of the feature points on the i-th image on the basis of the optical flow between the two images; and step c of finding a transformation for finding a position on the i-th image corresponding to each of points on the (i+1)-th image on the basis of each of the feature points on the i-th image and the corresponding point on the (i+1)-th image found in the step b.

The step a, for example, comprises the steps of extracting an overlapped portion of the i-th image and the (i+1)-th image, and extracting from the overlapped portion with the (i+1)-th image on the i-th image a plurality of the partial images which are effective for tracking by the optical flow between the two images, as the feature points.

In the step of extracting the overlapped portion of the i-th image and the (i+1)-th image, the overlapped portion of the i-th image and the (i+1)-th image is extracted on the basis of the SSD method, for example.

The step b, for example, comprises the steps of finding the optical flow from the i-th image and t the (i+1)-th image on the basis of an optical flow estimation method using the hierarchically structured Lucas-Kanade method for interpolating optical flow having low confidence out of optical flows obtained in the respective stages of the optical flow estimation method using optical flow in its surrounding regions, and tracking the point on the (i+1)-th image corresponding to each of the feature points on the i-th image, on the basis of the obtained optical flow.

In an image synthesizer for synthesizing a first image and a second image, a first image synthesizer according to the present invention is characterized by comprising first means for extracting from the first image a plurality of partial images which are effective for tracking by optical flow between the first image and the second image, as feature points, second means for tracking a point on the second image corresponding to each of the feature points on the first image, on the basis of the optical flow between the two images, third means for finding a transformation for finding, on the basis of each of the feature points on the first image and the corresponding point on the second image which is found by the second means, a position on the second image corresponding to each of points on the first image, or a position on the first image corresponding to each of points on the second image, and fourth means for synthesizing the first image and the second image such that the corresponding points on the first image and the second image coincide with each other on the basis of the obtained transformation.

The first means, for example, comprises means for extracting an overlapped portion of the first image and the second image, and means for extracting from the overlapped portion with the second image, on the first image, a plurality of the partial images which are effective for tracking by the optical flow between the two images, as the feature points.

The means for extracting the overlapped portion of the first image and the second image extracts the overlapped portion of the first image and the second image on the basis of the SSD method, for example.

The second means, for example, comprises means for finding the optical flow from the first image and the second image on the basis of an optical flow estimation method using the hierarchically structured Lucas-Kanade method for interpolating optical flow having low confidence out of optical flows obtained in the respective stages of the optical flow estimation method using optical flow in its surrounding regions, and means for tracking the point on the second image corresponding to each of the feature points on the first image, on the basis of the obtained optical flow.

In an image synthesizer in which from three or more images from a first image to a n-th image (n is an integer of not less than three), the first image and the n-th image are synthesized, with the first image as a reference image, a second image synthesizer according to the present invention is characterized by comprising first means for finding transformations for finding a position on an i-th image corresponding to each of points on an (i+1)-th image, taking i as each of integers from 1 to (n−1), second means for finding a transformation for finding a position on the first image corresponding to each of points on the n-th image, on the basis of all of the transformations found by the first means, and third means for synthesizing the first image and the n-th image such that the corresponding points of the first image and the n-th image coincide with each other, wherein the first means repeats the following steps a to c, by updating i by 1 from i=1 up to i=(n−1)

step a of extracting from the i-th image a plurality of partial images which are effective for tracking by optical flow between the i-th image and the (i+1)-th image, as feature points;

step b of tracking a point on the (i+1)-th image corresponding to each of the feature points on the i-th image on the basis of the optical flow between the two images; and step c of finding a transformation for finding a position on the i-th image corresponding to each of points on the (i+1)-th image on the basis of each of the feature points on the i-th image and the corresponding point on the (i+1)-th image found in the step b.

In an image synthesizer for synthesizing three or more images from a first image to a n-th image (n is an integer of not less than three), with the first image as a reference image, a third image synthesizer according to the present invention is characterized by comprising first means for finding transformations for finding a position on an i-th image corresponding to each of points on an (i+1)-th image, taking i as each of integers from 1 to (n−1) second means for finding, for each of images from a second image to the n-th image a transformation for finding a position on the first image corresponding to each of points on each of the second to n-th images on the basis of the transformations found by the first means, and third means for performing such processes as synthesizing the first image and the second image on the basis of the transformation for finding the position on the first image corresponding to each of the points on the second image and synthesizing the third image and the synthesized image of the first and second images on the basis of the transformation for finding the position on the first image corresponding to each of the points on the third image, and continuing such processes up until the n-th image and the synthesized image of the first to (n−1)-th images are synthesized on the basis of the transformation for finding the position on the first image corresponding to each of the points on the n-th image, thereby to obtain the synthesized image of the first to n-th images, wherein the first means repeats the following steps a to c , by updating i by 1 from i=1 up to i=(n−1)

step a of extracting from the i-th image a plurality of partial images which are effective for tracking by optical f low between the i-th image and the (i+1)-th image, as feature points;

step b of tracking a point on the (i+1)-th image corresponding to each of the feature points on the i-th image on the basis of the optical flow between the two images; and step c of finding a transformation for finding a position on the i-th image corresponding to each of points on the (i+1)-th image on the basis of each of the feature points on the i-th image and the corresponding point on the (i+1)-th image found in the step b.

The step a, for example, comprises the steps of extracting an overlapped portion of the i-th image and the (i+1)-th image, and extracting from the overlapped portion with the (i+1)-th image on the i-th image a plurality of the partial images which are effective for tracking by the optical flow between the two images, as the feature points.

In the step of extracting the overlapped portion of the i-th image and the (i+1)-th image, the overlapped portion of the i-th image and the (i+1)-th image is extracted on the basis of the SSD method, for example.

The step b, for example, comprises the steps of finding the optical flow from the i-th image and the (i+1)-th image on the basis of an optical flow estimation method using the hierarchically structured Lucas-Kanade method for interpolating optical flow having low confidence out of optical flows obtained in the respective stages of the optical flow estimation method using optical flow in its surrounding regions, and tracking the point on the (i+1)-th image corresponding to each of the feature points on the i-th image, on the basis of the obtained optical flow.

In a computer readable recording medium on which an image synthesis program for synthesizing a first image and a second image is recorded, a first computer readable recording medium according to the present invention is characterized in that the image synthesis program has a computer execute the following steps of the first step of extracting from the first image a plurality of partial images which are effective for tracking by optical flow between the first image and the second image, as feature points, the second step of tracking a point on the second image corresponding to each of the feature points on the first image, on the basis of the optical flow between the two images, the third step of finding a transformation for finding, on the basis of each of the feature points on the first image and the corresponding point on the second image which is found in the second step, a position on the second image corresponding to each of points on the first image, or a position on the first image corresponding to each of points on the second image, and the fourth step of synthesizing the first image and the second image such that the corresponding points on the first image and the second image coincide with each other on the basis of the obtained transformation.

The first step, for example, comprises the steps of extracting an overlapped portion of the first image and the second image, and extracting from the overlapped portion with the second image, on the first image, a plurality of the partial images which are effective for tracking by the optical flow between the two images, as the feature points.

In the step of extracting the overlapped portion of the first image and the second image, the overlapped portion of the first image and the second image is extracted on the basis of the SSD method, for example.

The second step, for example, comprises the steps of finding the optical flow from the first image and the second image on the basis of an optical flow estimation method using the hierarchically structured Lucas-Kanade method for interpolating optical flow having low confidence out of optical flows obtained in the respective stages of the optical flow estimation method using optical flow in its surrounding regions, and tracking the point on the second image corresponding to each of the feature points on the first image, on the basis of the obtained optical flow.

In a computer readable recording medium on which an image synthesis program for synthesizing, from three or more images from a first image to a n-th image (n is an integer of not less than three), the first image and the n-th image , with the first image as a reference image, is recorded, a second computer readable recording medium according to the present invention is characterized in that the image synthesis program has a computer execute the following steps of the first step of finding transformations for finding a position on an i-th image corresponding to each of points on an (i+1)-th image, taking i as each of integers from 1 to (n−1) the second step of finding a transformation for finding a position on the first image corresponding to each of points on the n-th image, on the basis of all of the transformations found in the first step, and the third step of synthesizing the first image and the n-th image such that the corresponding points of the first image and the n-th image coincide with each other, on the basis of the obtained transformation, wherein the first step repeats the following steps a to c, by updating i by 1 from i=1 up to i=(n−1):

step a of extracting from the i-th image a plurality of partial images which are effective for tracking by optical flow between the i-th image and the (i+1)-th image, as feature points;

step b of tracking a point on the (i+1)-th image corresponding to each of the feature points on the i-th image on the basis of the optical flow between the two images; and step c of finding a transformation for finding a position on the i-th image corresponding to each of points on the (i+1)-th image on the basis of each of the feature points on the i-th image and the corresponding point on the (i+1)-th image found in the step b.

In a computer readable recording medium on which an image synthesis program for synthesizing, from three or more images from a first image to a n-th image (n is an integer of not less than three), the first image and the n-th image, with the first image as a reference image, is recorded, a third computer readable recording medium according to the present invention is characterized in that the image synthesis program has a computer execute the following steps of the first step of finding transformations for finding a position on an i-th image corresponding to each of points on an (i+1)-th image, taking i as each of integers from 1 to (n−1), the second step of finding, for each of images from the second image to the n-th image, a transformation for finding a position on the first image corresponding to each of points on each of the second to n-th images, on the basis of the transformations found in the first step, and the third step of performing such processes as synthesizing the first image and the second image on the basis of the transformation for finding the position on the first image corresponding to each of the points on the second image and synthesizing the third image and the synthesized image of the first and second images on the basis of the transformation for finding the position on the first image corresponding to each of the points on the third image, and continuing such processes up until the n-th image and the synthesized image of the first to (n−1)-th images are synthesized on the basis of the transformation for finding the position on the first image corresponding to each of the points on the n-th image, thereby to obtain the synthesized image of the first to n-th images, wherein the first step repeats the following steps a to c, by updating i by 1 from i=1 up to i=(n−1)

step a of extracting from the i-th image a plurality of partial images which are effective for tracking by optical flow between the i-th image and the (i+1)-th image, as feature points;

step b of tracking a point on the (i+1)-th image corresponding to each of the feature points on the i-th image on the basis of the optical flow between the two images; and step c of finding a transformation for finding a position on the i-th image corresponding to each of points on the (i+1)-th image on the basis of each of the feature points on the i-th image and the corresponding point on the (i+1)-th image found in the step b.

The step a, for example, comprises the steps of extracting an overlapped portion of the i-th image and the (i+1)-th image, and extracting from the overlapped portion with the (i+1)-th image on the i-th image a plurality of the partial images which are effective for tracking by the optical flow between the two images, as the feature points.

In the step of extracting the overlapped portion of the i-th image and the (i+1)-th image, the overlapped portion of the i-th image and the (i+1)-th image is extracted on the basis of the SSD method, for example.

The step b, for example, comprises the steps of finding the optical flow from the i-th image and the (i+1)-th image on the basis of an optical flow estimation method using the hierarchically structured Lucas-Kanade method for interpolating optical flow having low confidence out of optical flows obtained in the respective stages of the optical flow estimation method using optical flow in its surrounding regions, and tracking the point on the (i+1)-th image corresponding to each of the feature points on the i-th image, on the basis of the obtained optical flow.

In a digital camera with a function of synthesizing a first image and a second image, a digital camera according to the present invention is characterized by comprising first means for extracting from the first image a plurality of partial images which are effective for tracking by optical flow between the first image and the second image, as feature points, second means for tracking a point on the second image corresponding to each of the feature points on the first image, on the basis of the optical flow between the two images, third means for finding a transformation for finding, on the basis of each of the feature points on the first image and the corresponding point on the second image which is found by the second means, a position on the second image corresponding to each of points on the first image, or a position on the first image corresponding to each of points on the second image, and fourth means for synthesizing the first image and the second image such that the corresponding points on the first image and the second image coincide with each other, on the basis of the obtained transformation.

In a printer with a function of synthesizing a first image and a second image, a printer according to the present invention is characterized by comprising first means for extracting from the first image a plurality of partial images which are effective for tracking by optical flow between the first image and the second image, as feature points, second means for tracking a point on the second image corresponding to each of the feature points on the first image, on the basis of the optical flow between the two images, third means for finding a transformation for finding, on the basis of each of the feature points on the first image and the corresponding point on the second image which is found by the second means, a position on the second image corresponding to each of points on the first image, or a position on the first image corresponding to each of points on the second image, and fourth means for synthesizing the first image and the second image such that the corresponding points on the first image and the second image coincide with each other, on the basis of the obtained transformation.

DETAILED DESCRIPTION OF THE PREFERRED EMBODIMENTS

[1] Description of an Optical Flow Estimation Method According to the Present Invention An optical flow estimation method according to the present invention presupposes hierarchical prediction for producing images having resolutions which are different at several levels like a pyramid hierarchical structure to gradually calculate optical flow. A method of calculating the optical flow conforms to a gradient method such as the Lucas-Kanade method. That is, it presupposes an optical flow estimation method using a hierarchically structured gradient method. The Lucas-Kanade method is used as a gradient method.

The optical flow estimation method according to the present invention is characterized in that optical flow obtained in respective stages of an optical flow estimation method using the hierarchically structured Lucas-Kanade method is filled (interpolated) by dilation processing. This will be described in detail below.

One of advantages of the Lucas-Kanade method is that the result of tracking have confidence. Tomasi and Kanade have showed that the trackability of a region can be calculated from image derivatives as follows (C. Tomasi and Kanade, "Shape and Motion from Image Streams : a Factorization method-Part 3 Detection and Tracking of Point Features, "CMU-CS-91-132, Carnegie Mellon University, 1991).

From a 2×2 matrix of coefficients G in the following equation (9) having as elements the squares of differentials in the vertical and horizontal directions of an image region a, its eigenvalues are calculated, so that the trackability of the region can be determined:

$$G = \sum_{p \in \omega} g(p)g(p)^T \quad (9)$$

When both the eigenvalues of the matrix G are large, the region changes in orthogonal directions, and can be uniquely positioned. Consequently, the confidence $\gamma$ of the result of tracking can be obtained by the following equation (10) from the smaller eigenvalue $\lambda_{min}$ and a gray scale residual E between the regions after the tracking:

$$\gamma = \frac{\lambda_{min}}{E} \quad (10)$$

The inventors of the present invention have developed a method of interpolating a region having low confidence using the result having high confidence in the same hierarchy in optical flow. This uses the result in a hierarchy at the next coarser resolution level for only an initial value for tracking and does not utilize the result in a hierarchy at the current resolution level which is paid attention to. Alternatively, it is assumed that optical flow in a region which is hardly textured has a value close to optical flow in its surrounding regions, to fill a flow field by morphology processing.

Figure 1B:
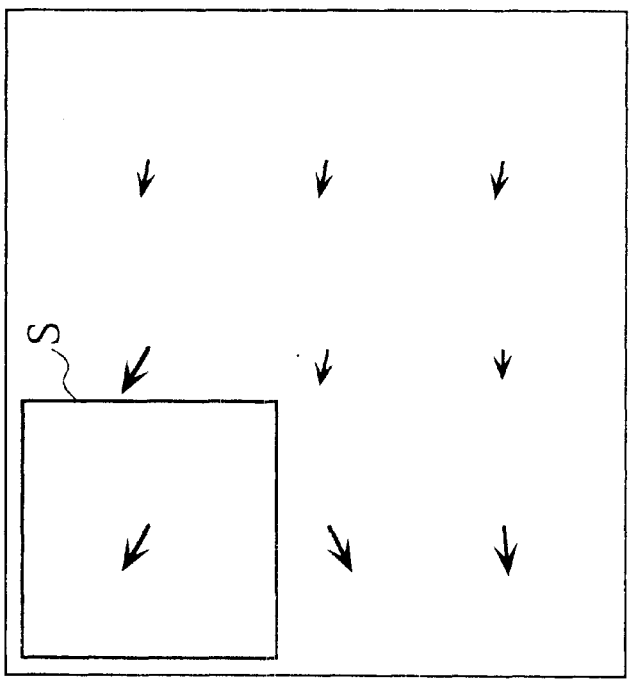
FIGS. 1a to 1d are schematic views for explaining a hierarchical estimation method.
Figure 1A:
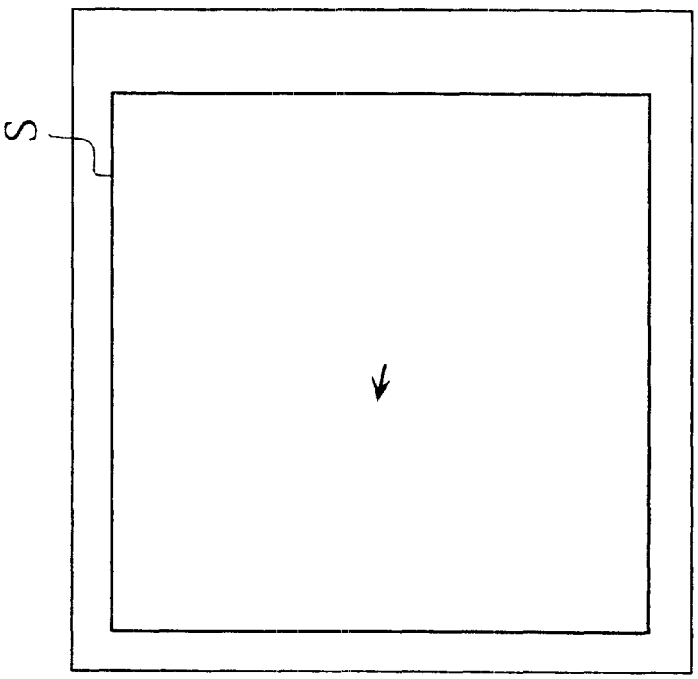
Figure 1D:
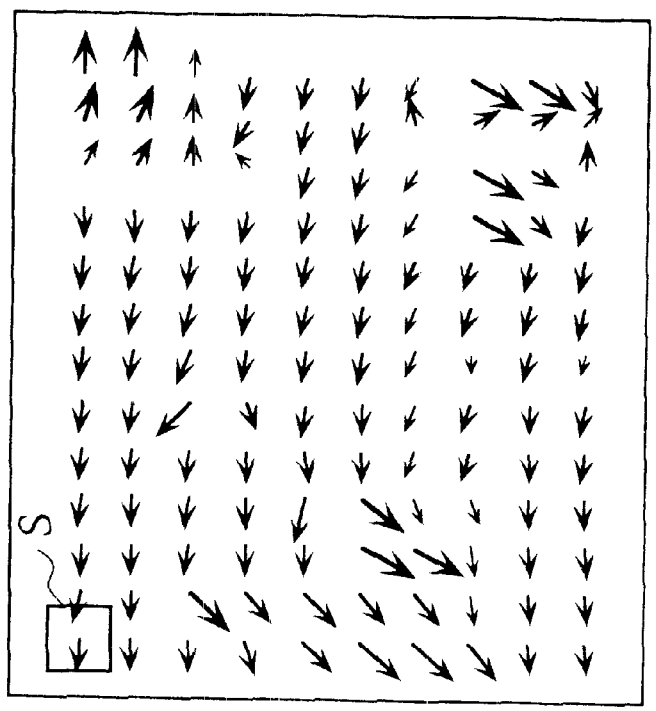
Figure 1C:
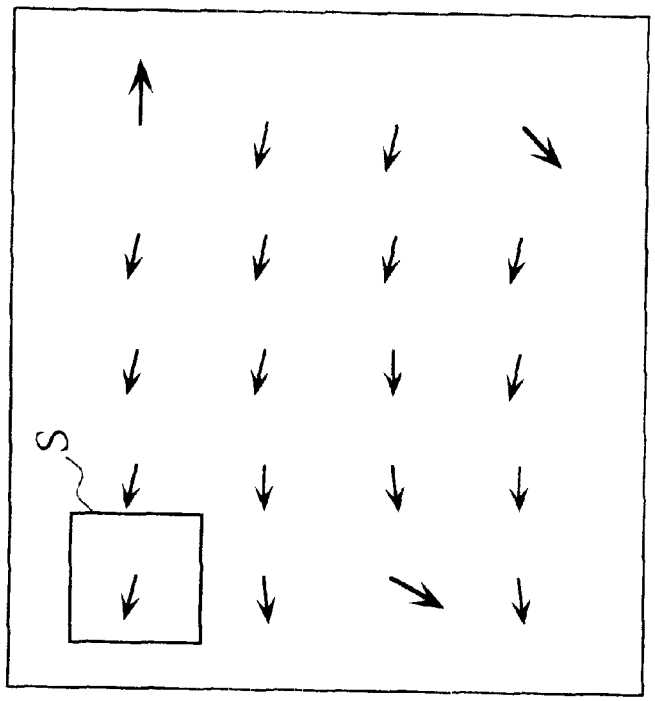
Figure 2:
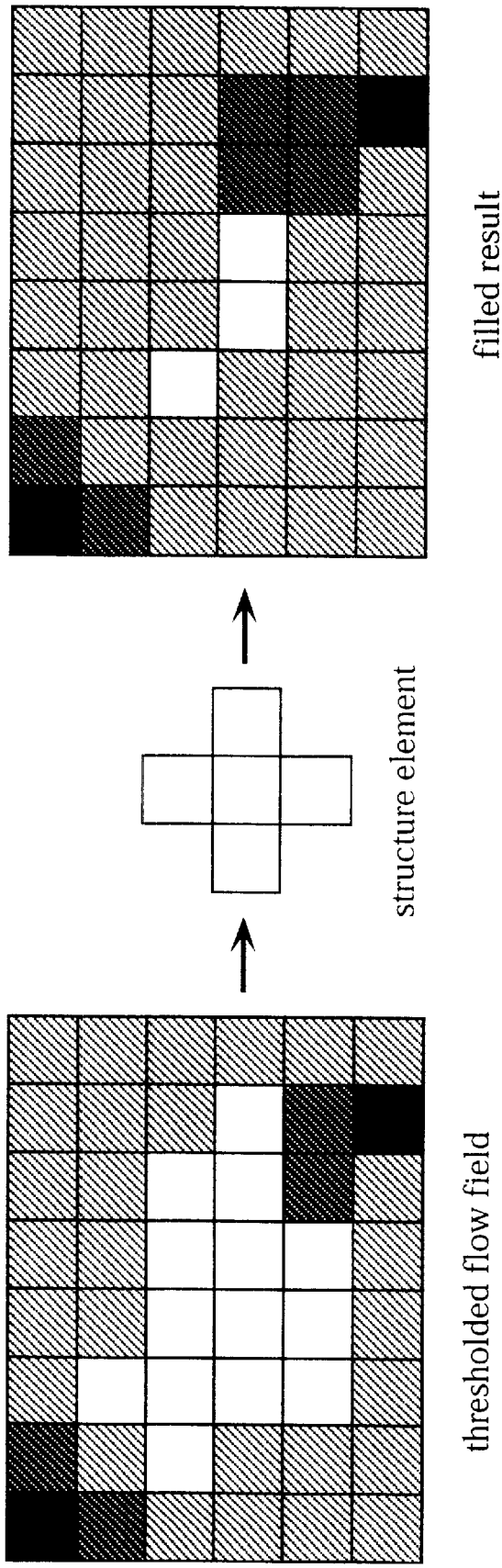
FIG. 2 is a schematic view for explaining dilation processing performed in an optical flow estimation method according to the present invention.

FIG. 2 shows how flow vector dilation processing is performed.

The left drawing represents a map of the confidence of a flow vector on the gray scale. It is assumed that the blacker the map is, the higher the confidence is.

Obtained flow is first subjected to threshold processing. A white portion is subjected to threshold processing because the result has low confidence.

The dilation processing of the result in the flow field is then performed as follows in imitation of hole filling processing using a morphology operation in a binary image. A flow vector u(i, j) in coordinates i,j of a region can be calculated, as expressed by the following equation (11), upon being weighted depending on confidence $\gamma$ from flow vectors in its four vicinities:

$$u(i, j) = \sum_{p,q} \frac{\gamma(i+p, j+q) \times u(i+p, j+q)}{\gamma_A} \quad (11)$$

$$(p, q) = (0, 1), (0, -1), (-1, 0), (1, 0)$$

$$\gamma_A = \sum_{p,q} \gamma(i+p, j+q)$$

The processing is repeated until all regions having low confidence which are subjected to threshold processing are filled. The filling processing is performed in each hierarchy. The flow vector u(i, j) in coordinates i,j of a region may be calculated upon being weighted depending on confidence $\gamma$ from flow vectors in its eight vicinities.

Figure 3B:
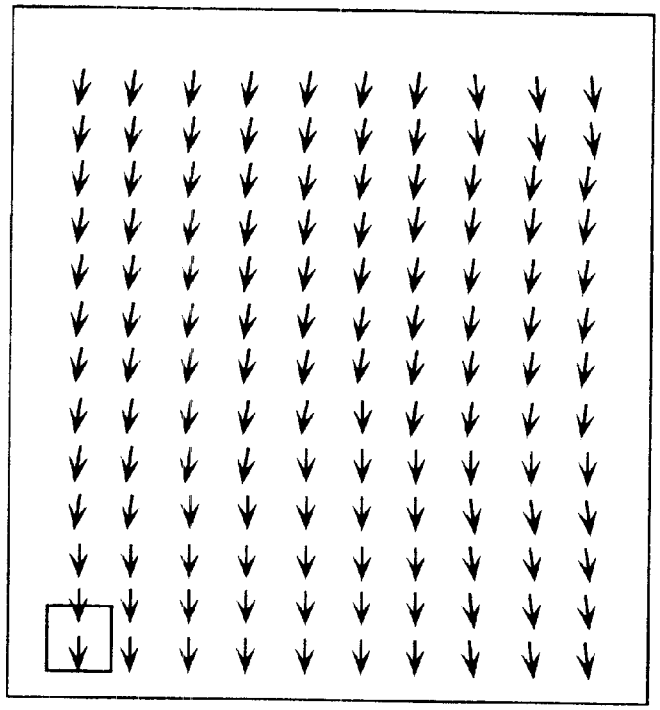
FIG. 3b is a schematic view showing optical flow after filling.
Figure 3A:
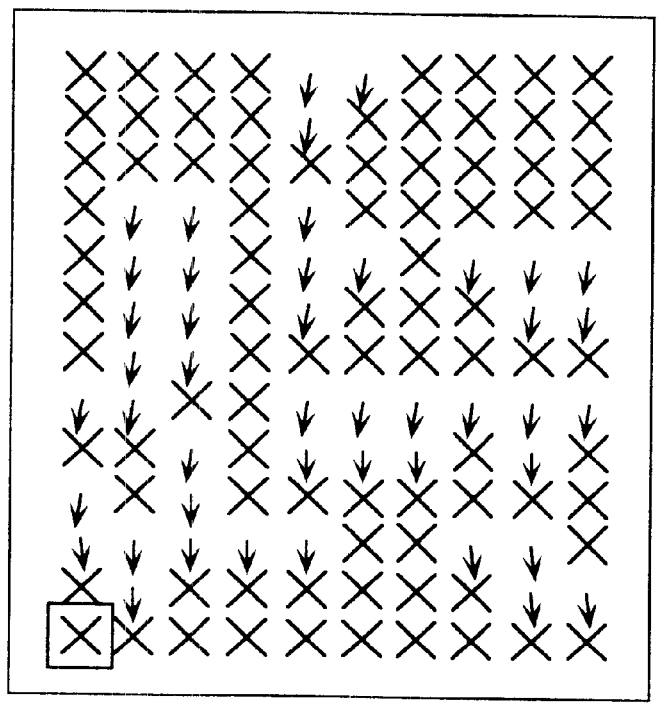
FIG. 3a is a schematic view showing an example of optical flow which is subjected to threshold processing for an image in a hierarchy.

FIG. 3a shows optical flow which is subjected to threshold processing for an image in a hierarchy, and FIG. 3b shows optical flow after filling. In FIG. 3a, arrows are optical flow vectors whose confidence is judged to be high by the threshold processing, and X marks indicate portions whose confidence is judged to be low.

[2] Description of a Panoramic Image Synthesizer

Description is now made of a panoramic image synthesizer for obtaining a seamless panoramic image from a plurality of images.

Figure 4:
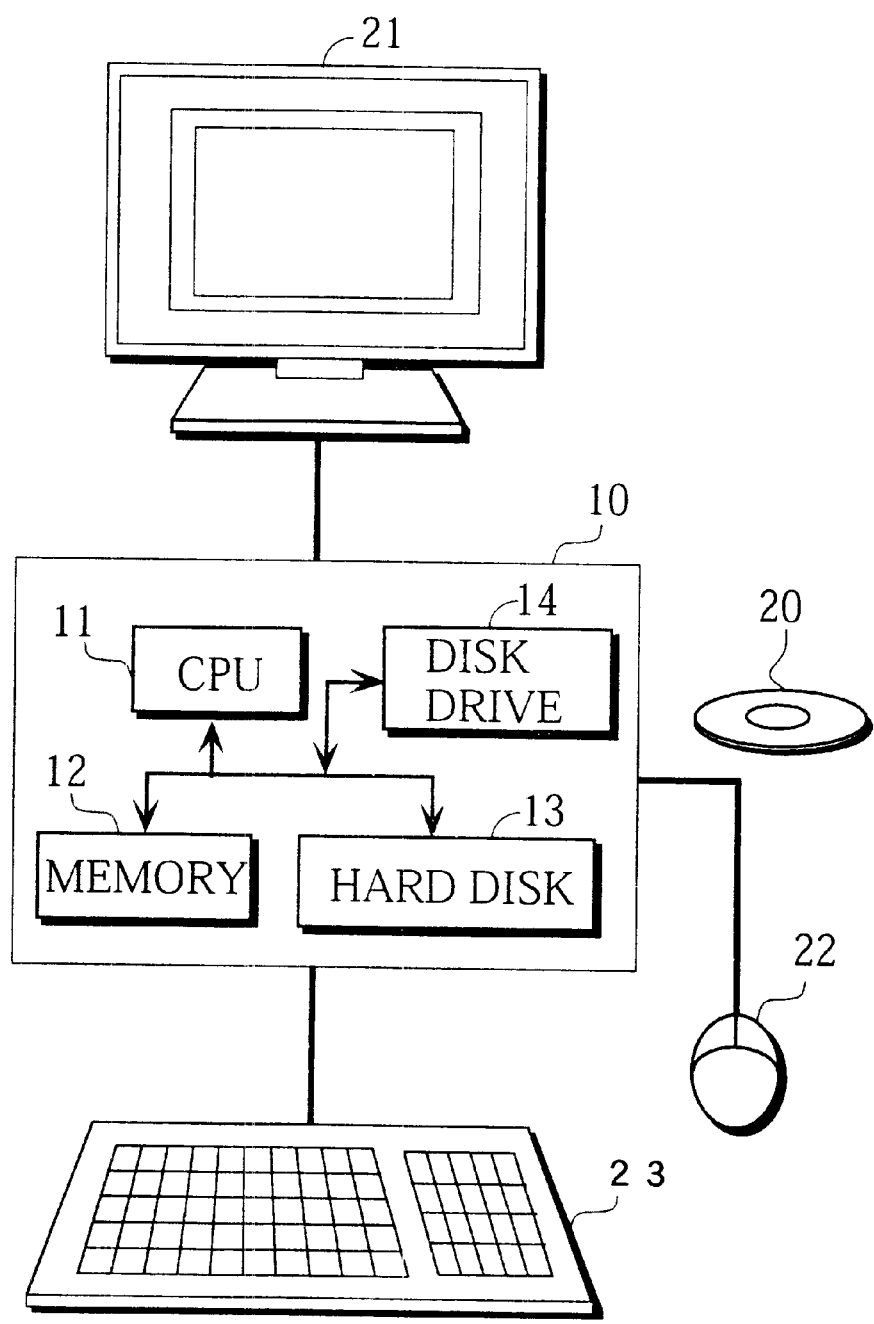
FIG. 4 is a block diagram showing the construction of a panoramic image synthesizer.

FIG. 4 illustrates the construction of a panoramic image synthesizer.

A display 21, a mouse 22 and a keyboard 23 are connected to a personal computer 10. The personal computer 10 comprises a CPU 11, a memory 12, a hard disk 13, and a drive 14 of a removable disk such as a CD-ROM.

The hard disk 13 stores a panoramic image synthesis program in addition to an OS (Operating System). The panoramic image synthesis program is installed in the hard disk 13 using a CD-ROM 20 storing the program. It is assumed that a plurality of images picked up by a digital camera are previously stored in the hard disk 13.

[2-1] Description of a Panoramic Image Synthesis Method in a Case Where Two Images are Synthesized Description is now made of panoramic image synthesis processing in a case where two images are synthesized.

Figure 5:
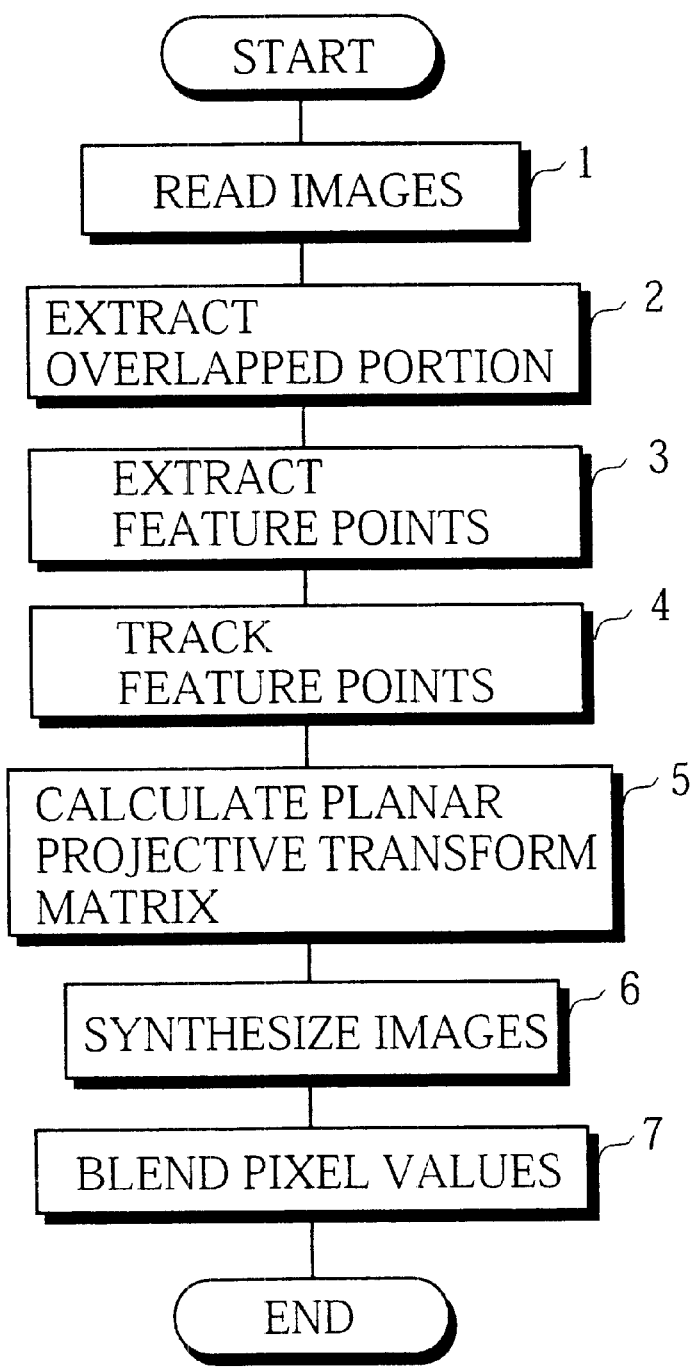
FIG. 5 is a flow chart showing the procedure for panoramic image synthesis processing.

FIG. 5 shows the procedure for panoramic image synthesis processing performed by the CPU 11 in a case where a panoramic image synthesis program is started.

(I) Two images (a first image and a second image) which are designated by a user are read in the memory 12 (step 1).

(II) Processing for extracting an overlapped portion of the two images is then performed (step 2). The processing for extracting the overlapped portion is performed on the basis of the SSD (Sum of Squared Differences) method.

Specifically, with respect to the two images, images $I_1$ and $I_2$ having lower resolution than that of the original images are first respectively produced. An overlapped portion $\omega$ (size: M×N) of the two images $I_1$ and $I_2$ having low resolution is found using a squared error (E) per pixel, as expressed by the following equation (12). The amount of movement (d) between the images is changed in an allowable range, and the overlapped portion is extracted from the amount of movement (d) in a case where E is the smallest. Like two successive images picked up by a video camera, for example, if difference between the two images is small, the processing for extracting the overlapped portion can be eliminated.

$$E(d) = \frac{\sum_{\omega}(I_1(x) - I_2(x+d))^2}{M \times N} \quad (12)$$

(III) Feature points are then extracted (step 3). That is, a plurality of partial images (rectangular regions) which are effective for tracking by optical flow between the first and second images are extracted as feature points from the overlapped portion with the second image, on the first image. In this case, the feature points are extracted such that they are not overlapped with each other. Specifically, a portion having the larger eigenvalue $\lambda_{min}$ as described above (see the equation (10)) is extracted as the feature point.

(IV) The feature points are then subjected to tracking processing (step 4). That is, a point, on the second image, of the extracted feature point on the first image is tracked.

Specifically, an optical flow vector for each patch of suitable size (13×13, for example) is first found by the optical flow estimation method described in the item [1]. The point, on the second image, corresponding to the feature point on the first image is found in units not exceeding units of pixels by linear interpolation from flow vectors in the patch in four vicinities of the feature point on the first image.

(V) A planar projective transform matrix is then calculated (step 5).

Figure 6:
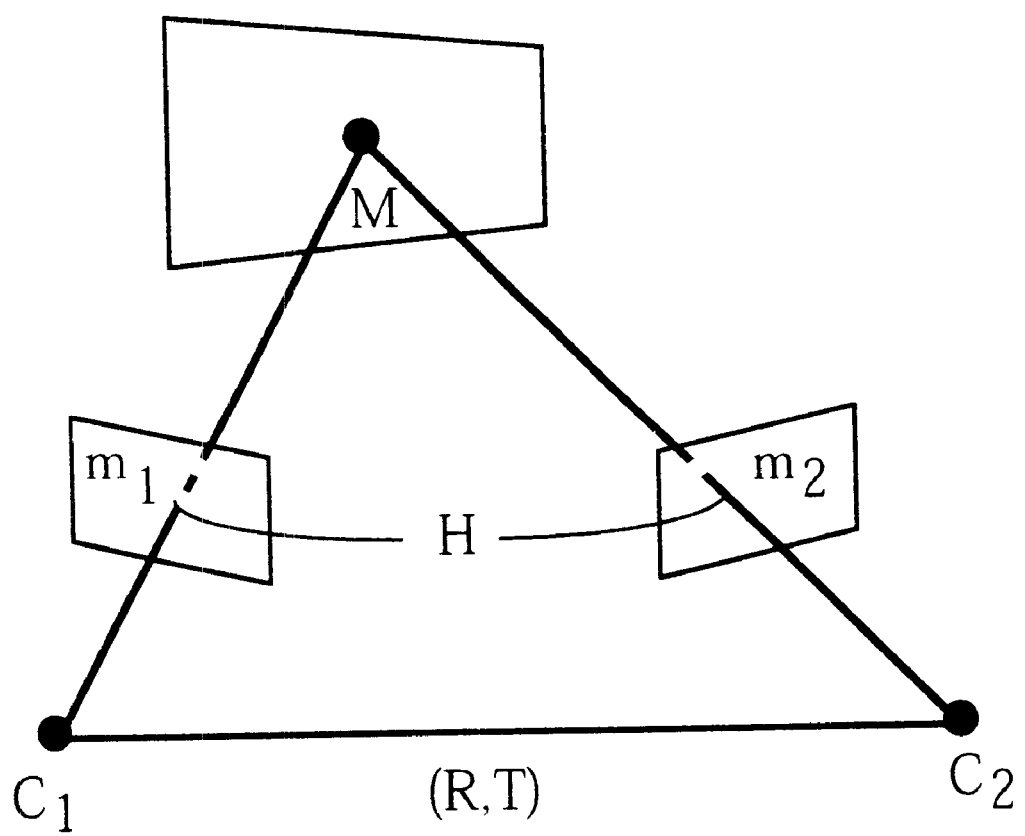
FIG. 6 is an illustration for explaining a planar projective matrix.

When a scene to be an object is far, or is a wall of a building or a black board, or the like even if it is near, it can be assumed that it exists on a single plane. It is known in projective geometry that when a point M on a single plane in a three-dimensional space is observed from two different points of view $C_1$ and $C_2$, as shown in FIG. 6, transform between coordinates $m_1$ and $mj_2$ on their respective image surfaces is linear, which is referred to as homography (O. Faugeras, "Three-Dimension Computer Vision: a Geometric Viewpoint", MIT press, 1993.).

That is, in a case where the coordinates of an image are represented by homogeneous coordinates, a point $m_2=(x_2, y_2, 1)^t$ on the second image has a corresponding point $m_1=(x_1, y_1, 1)^t$ on the first image, and the relationship therebetween is defined by the following equation (13):

$$m_1 \sim Hm_2 = \begin{pmatrix} h_0 & h_1 & h_2 \\ h_3 & h_4 & h_5 \\ h_6 & h_7 & 1 \end{pmatrix} \begin{pmatrix} x_2 \\ y_2 \\ 1 \end{pmatrix} \quad (13)$$

indicates projective equivalence, leaving a scale factor.
The transform matrix can be rewritten, as expressed by the following equations (14):

$$x_1 = \frac{h_0 x_2 + h_1 y_2 + h_2}{h_6 x_2 + h_7 y_2 + 1} \quad (14)$$

$$y_1 = \frac{h_3 x_2 + h_4 y_2 + h_5}{h_6 x_2 + h_7 y_2 + 1}$$

(VI) An image is produced by overlapping both the images with each other such that the positions of the two images coincide with each other on the basis of the found planar projective transform matrix (step 6). Since the transform matrix for transforming each of points on the second image into a corresponding position on the first image, is found in the step 5, a synthesized image of the first and second images, with the first image as a reference image, is obtained.

In the step 5, a transform matrix for transforming each of points on the first image into a corresponding position on the second image may be found, based on a point on the second image corresponding to each of the feature points on the first image. When the transform matrix for transforming each of points on the first image into a corresponding position on the second image is found, a synthesized image of the first and second images, with the second image as a reference image, is obtained.

(VII) Pixel values are blended with respect to an overlapped portion of the two images (step 7). That is, the first image and the second image are not the same in pick-up conditions, so that one of the images may, in some cases, be darker than the other image. Therefore, pixel values of the two images are blended in the overlapped portion of the images.

Figure 7:
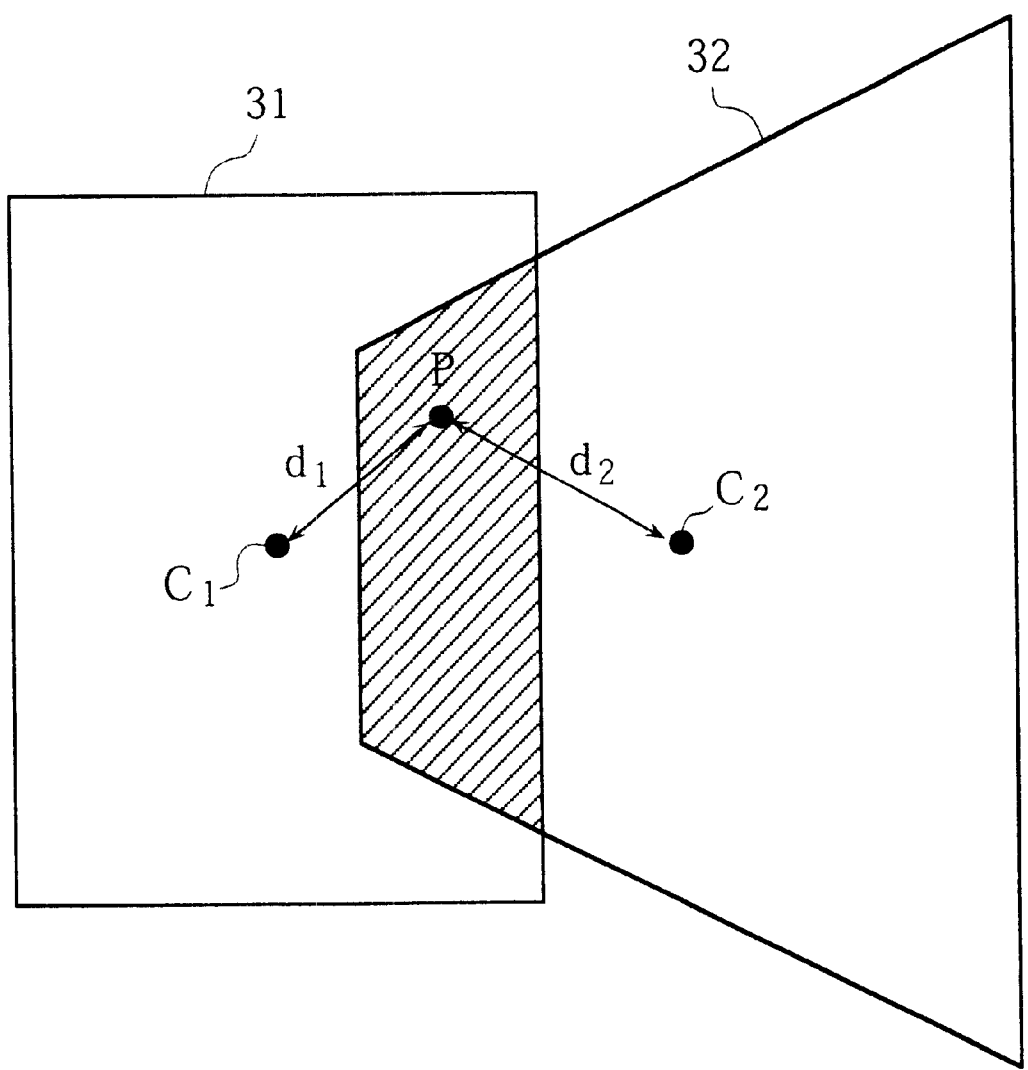
FIG. 7 is an illustration for explaining an example of a pixel value blending method.

An example of a pixel value blending method is now described. FIG. 7 illustrates the image produced in step 6. The portion with oblique lines in FIG. 7 shows the overlapped portion of the first image 31 and the second image 32. In FIG. 7, $C_1$ and $C_2$ indicate the center of gravity of the first image and the center of gravity of the second image, respectively.

If a pixel value of an arbitrary point P within the overlapped portion, on the first image 31, is $I_1$, a pixel value of the arbitrary point P on the second image 32 is $I_2$, a distance between the point P and the center of gravity $C_1$ of the first image is $d_1$, and a distance between the point P and the center of gravity $C_2$ of the second image is $d_2$, a pixel value Blen of the point P obtained by pixel blending is expressed by the following equation (15):

$$Blen = \frac{d_2 \cdot I_1 + d_1 \cdot I_2}{d_1 + d_2} \quad (15)$$

In the above-mentioned embodiment, an image is produced by overlapping both the images with each other such that corresponding positions in the two images coincide with each other, based on the planar projective transform matrix, while an image can be produced by overlapping both the images with each other such that corresponding positions in the two images coincide with each other, based on an affine transform matrix.

[2-2] Description of a Panoramic Image Synthesis Method in a Case Where Three or More Images are Synthesized Description is now made of panoramic image synthesis processing in a case where three or more images are synthesized. The synthesis method described below is also applied to the case where three or more still images are synthesized, as well as the case where three or more images sequentially picked up by a video camera are synthesized.

[2-2-1] In a case where three images A, B and C are synthesized, with the image B as a reference image, for example In this instance, a planar projective transform matrix H(AB) for transforming each of points on the image A into a corresponding position on the image B, is first found, using the method described in the a item [2-1]. Based on the obtained planar projective transform matrix H(AB), the image A and the image B are synthesized.

Furthermore, a planar projective transform matrix H(CB) for transforming each of points on the image C into a corresponding position on the image B is found, using the method described in the item [2-1]. Based on the obtained planar projective transform matrix H(CB), the image C and the synthesized image of the images A and B are then synthesized.

[2-2-2] In a case where three images A, B and C are synthesized, with the image A as a reference image.

In this instance, there are two synthesis methods as described below.

(1) First Method

A planar projective transform matrix H(BA) for transforming each of points on the image B into a corresponding position on the image A, is first found, using the method described in the item [2-1] Based on the obtained planar projective transform matrix H (BA), the image B and the image A are synthesized.

Furthermore, a planar projective transform matrix H(CA) for transforming each of points on the image C into a corresponding position on the image A is found, using the method described in the item [2-1]. Based on the obtained planar projective transform matrix H(CA), the image C and the synthesized image of the images A and B are then synthesized.

(2) Second Method

A planar projective transform matrix H(BA) for transforming each of points on the image B into a corresponding position on the image A, is first found, using the method described in the item [2-1] Based on the obtained planar projective transform matrix H(BA), the image B and the image A are synthesized.

A planar projective transform matrix H(CB) for transforming each of points on the image C into a corresponding position on the image B is found, using the method described in the item [2-1]. A planar projective transform matrix H(CA) for transforming each of points on the image C into a corresponding position on the image A is found by multiplying the planar projective transform matrix H(BA) for transforming each of points on the image B into a corresponding position on the image A, by the planar projective transform matrix H(CB) for transforming each of points on the image C into a corresponding position on the image B. Based on the obtained planar projective transform matrix {H(CA)=H(BA) H(CB)} the image C and the synthesized image of the images A and B are then synthesized.

In a similar way to the above-mentioned second method, four images A, B. C and D can be synthesized, with the image A as a reference image.

Specifically, a planar projective transform matrix H(BA) for transforming each of points on the image B into a corresponding position on the image A, a planar projective transform matrix H(CB) for transforming each of points on the image C into a corresponding position on the image B, and a planar projective transform matrix H(DC) for transforming each of points on the image D into a corresponding position on the image C, are found respectively.

Based on the planar projective transform matrix H (BA) for transforming each of points on the image B into a corresponding position on the image A and the planar projective transform matrix H(CB) for transforming each of points on the image C into a corresponding position on the image B, a planar projective transform matrix {H(CA)=H (BA)·H(CB)} for transforming each of points on the image C into a corresponding position on the image A is found.

Based on the planar projective transform matrix H(BA) for transforming each of points on the image B into a corresponding position on the image A, the planar projective transform matrix H(CB) for transforming each of points on the image C into a corresponding position on the image B, and the planar projective transform matrix H(DC) for transforming each of points on the image D into a corresponding position on the image C, a planar projective transform matrix {H(DA)=H(BA)·H(CB)·H(DC)} for transforming each of points on the image D into a corresponding position on the image A is found.

Based on the planar projective transform matrix H(BA) for transforming each of points on the image B into a corresponding position on the image A, the image B and the image A are synthesized.

Based on the planar projective transform matrix {H(CA)=H (BA)·H (CB)} for transforming each of points on the image C into a corresponding position on the image A, the image C and the synthesized image of the images A and B are synthesized.

Based on the planar projective transform matrix {H(DA)= H(BA)·H(CB)·H(DC)} for transforming each of points on the image D into a corresponding position on the image A, the image D and the synthesized image of the images A, B and C are synthesized.

A similar method can be applied to synthesize five or more images.

In the cases where two images are synthesized and where three or more images are synthesized, it is preferable to enable a user to choose which image should be a reference image.

Furthermore, when only two images A and C out of three images A, B and C are synthesized, with the image A as a reference image, a planar projective transform matrix H(CA) for transforming each of points on the image C into a corresponding position on the image A can be found by multiplying a planar projective transform matrix H(BA) for transforming each of points on the image B into a corresponding position on the image A, by a planar projective transform matrix H(CB) for transforming each of points on the image C into a corresponding position on the image B.

[3] Description of Other Applications

A panoramic image synthesis program which is used in the above-mentioned image synthesizer can be commercialized as a simplex. For instance, it is possible to provide the panoramic image synthesis program which is recorded on a removable disk such as a CD-ROM.

Figure 8:
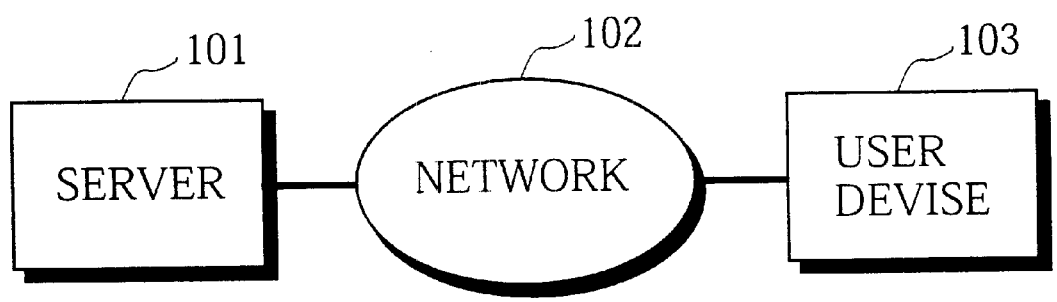
FIG. 8 is a schematic view illustrating the case where a file of a panoramic image synthesis program is provided to a user through a server.

Furthermore, in a system where a server 101 and a user device 103 are connected through a network 102 such as the Internet as shown in FIG. 8, it is possible to register a file of the panoramic image synthesis program in the hard disk of the server 101 and then have the user device 103 download the file, thereby to provide the panoramic image synthesis program to the user.

The panoramic image synthesis program can also be incorporated into a printer for a digital still camera image printing laboratory, a printer for outputting a digital camera image, a digital camera, a copying machine, or the like.

Figure 9:
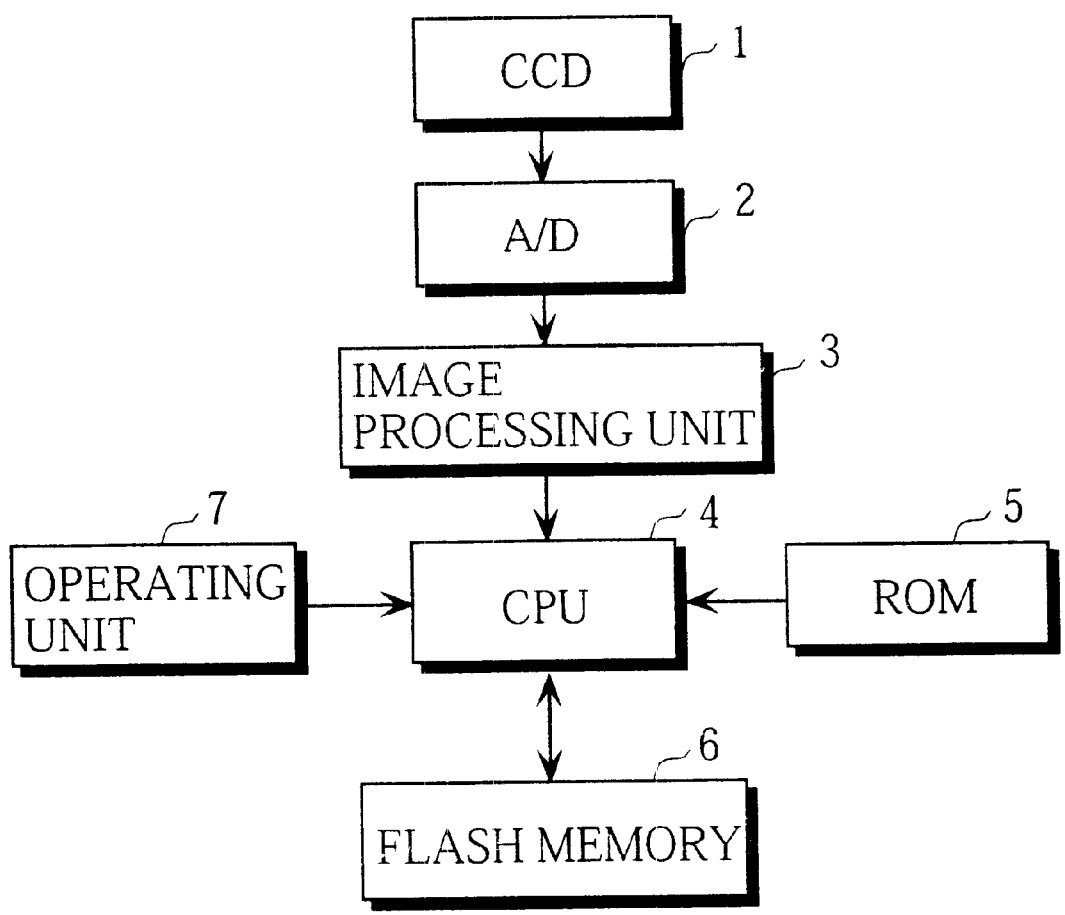
FIG. 9 is a block diagram showing the construction of a digital still camera in which a panoramic image synthesis program is incorporated.

FIG. 9 illustrates the construction of a digital still camera in which the panoramic image synthesis program is incorporated.

The digital still camera comprises a CCD 1, an analog-to-digital (A/D) converter 2, an image processing unit 3, a CPU 4, a ROM 5, a flash memory 6, an operating unit 7, and the like, similarly to the normal digital still camera. The panoramic image synthesis program is stored in the ROM 5.

The panoramic image synthesis program is started by operating the operating unit 7, so that a plurality of images which have been already accepted in the flash memory 6 are synthesized by the method described in the item [2-1] or [2-2], to produce one panoramic image. The produced panoramic image is stored in the flash memory 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical flow estimation method adapted to calculate optical flow for each patch on the basis of two Images, said method comprising the steps of:

separating a region having low confidence and a region having high confidence, depending on confidence of said optical flow; and interpolating said optical flow in said region having low confidence using said optical flow in said low confidence region surrounding regions;

wherein confidence y is found, upon calculating from a 2×2 matrix of coefficients G in the following equation (a) having as elements the squares of differentials in the vertical and horizontal directions of an image region ω and its eigenvalues, by the following equation (b) from the smaller eigenvalue $\lambda_{min}$ and a gray scale residual E between the regions after tracking:

$$G = \sum_{p \in \omega} g(p)g(p)^T \quad (a)$$

$$y = \frac{\lambda_{min}}{E}. \quad (b)$$

2. An image synthesis method for synthesizing a first image and a second image, comprising:

the first step of extracting from said first image a plurality of partial images which are effective for tracking by optical flow between said first image and said second image, as feature points;

the second step of tracking a point on said second image corresponding to each of said feature points on said first image, on the basis of said optical flow between said two images;

the third step of finding a transformation for finding, on the basis of each of said feature points on said first image and the corresponding point on said second image which is found in said second step, a position on said second image corresponding to each of points on said first image, or a position on said first image corresponding to each of points on said second image; and the fourth step of synthesizing said first image and said second image such that the corresponding points on said first image and said second image coincide with each other on the basis of said obtained transformation.

3. The image synthesis method according to claim 2, wherein said first step comprises the steps of extracting an overlapped portion of said first image and said second image, and extracting from said overlapped portion with said second image, on said first image, a plurality of said partial images which are effective for tracking by said optical flow between said two images, as said feature points.

4. The image synthesis method according to claim 3, wherein in said step of extracting said overlapped portion of said first image and said second image, said overlapped portion of said first image and said second image is extracted on the basis of the Sum of Squared Differences method.

5. The image synthesis method according to claim 2, wherein said second step comprises the steps of finding said optical flow from said first image and said second image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said second image corresponding to each of said feature points on said first image, on the basis of said obtained optical flow.

6. An image synthesis method in which from three or more images from a first image to a n-th image (n is an integer of not less than three), said first image and said n-th image are synthesized, with said first image as a reference image, comprising:

the first step of finding transformations for finding a position on an i-th image corresponding to each of points on an (i+1)-th image, taking i as each of integers from 1 to (n−1);

the second step of finding a transformation for finding a position on the first image corresponding to each of points on said n-th image, on the basis of all of said transformations found in said first step; and the third step of synthesizing said first image and said n-th image such that the corresponding points of said first image and said n-th image coincide with each other;

wherein said first step repeats the following steps a to c, by updating i by 1 from i=1 up to i=(n−1):

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and step c of finding a transformation for finding a position on said i-th image corresponding to each of points on said (i+1)-th image on the basis of each of said feature points on said i-th image and the corresponding point on said (i+1)-th image found in said step b.

7. The image synthesis method according to claim 6, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

8. The image synthesis method according to claim 7, wherein in said step of extracting said overlapped portion of said i-th image and said (i+1)-th image, said overlapped portion of said i-th image and said (i+1)-th image is extracted on the basis of the Sum of Squared Differences method.

9. The image synthesis method according to claim 6, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

10. An image synthesis method for synthesizing three or more images from a first image to a n-th image (n is an integer of not less than three), with said first image as a reference image, comprising:

the first step of finding transformations for finding a position on an i-th image corresponding to each of points on an (i+1)-th image, taking i as each of integers from 1 to (n−1);

the second step of finding, for each of images from a second image to said n-th image, a transformation for finding a position on said first image corresponding to each of points on each of said second to n-th images, on the basis of said transformations found in said first step; and the third step of performing such processes as synthesizing said first image and said second image on the basis of said transformation for finding the position on said first image corresponding to each of the points on said second image and synthesizing said third image and the synthesized image of said first and second images on the basis of said transformation for finding the position on said first image corresponding to each of the points on said third image, and continuing such processes up until said n-th image and the synthesized image of said first to (n−1)-th images are synthesized on the basis of said transformation for finding the position on said first image corresponding to each of the points on said n-th image, thereby to obtain the synthesized image of said first to n-th images, wherein said first step repeats the following steps a to c, by updating i by 1 from i=1 up to i=(n−1):

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and s step c of finding a transformation for finding a position on said i-th image corresponding to each of points on said (i+1)-th image on the basis of each of said feature points on said i-th image and the corresponding point on said (i+1)-th image found in said step b.

11. The image synthesis method according to claim 10, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

12. The image synthesis method according to claim 11, wherein in said step of extracting said overlapped portion of said i-th image and said (i+1)-th image, said overlapped portion of said i-th image and said (i+1)-th image is extracted on the basis of the Sum of Squared Differences method.

13. The image synthesis method according to claim 10, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

14. An image synthesizer for synthesizing a first image and a second image, comprising:

first means for extracting from said first image a plurality of partial images which are effective for tracking by optical flow between said first image and said second image, as feature points;

second means for tracking a point on said second image corresponding to each of said feature points on said first image, on the basis of said optical flow between said two images;

third means for finding a transformation for finding, on the basis of each of said feature points on said first image and the corresponding point on said second image which is found by said second means, a position on said second image corresponding to each of points on said first image, or a position on said first image corresponding to each of points on said second image; and fourth means for synthesizing said first image and said second image such that the corresponding points on said first image and said second image coincide with each other on the basis of said obtained transformation.

15. The image synthesizer according to claim 14, wherein said first means comprises means for extracting an overlapped portion of said first image and said second image, and means for extracting from said overlapped portion with said second image, on said first image, a plurality of said partial images which are effective for tracking by said optical flow between said two images, as said feature points.

16. The image synthesizer according to claim 15, wherein said means for extracting said overlapped portion of said first image and said second image extracts said overlapped portion of said first image and said second image on the basis of the Sum of Squared Differences method.

17. The image synthesizer according to claim 14, wherein said second means comprises means for finding said optical flow from said first image and said second image on the basis of an optical flow estimation method using the hierarchically structured Lucas-Kanade method for interpolating optical flow having low confidence out of optical flows obtained in the respective stages of said optical flow estimation method using optical flow in its surrounding regions, and means for tracking the point on said second image corresponding to each of said feature points on said first image, on the basis of said obtained optical flow.

18. An image synthesizer in which from three or more images from a first image to a n-th image (n is an integer of not less than three), said first image and said n-th image are synthesized, with said first image as a reference image, comprising:

first means for finding transformations for finding a position on an i-th image corresponding to each of points on an (i+1)-th image, taking i as each of integers from 1 to (n−1);

second means for finding a transformation for finding a position on said first image corresponding to each of points on said n-th image, on the basis of all of said transformations found by said first means; and third means for synthesizing said first image and said n-th image such that the corresponding points of said first image and said n-th image coincide with each other;

wherein said first means repeats the following steps a to c, by updating i by 1 from i=1 up to i=(n−1)

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and step c of finding a transformation for finding a position on said i-th image corresponding to each of points on said (i+1)-th image on the basis of each of said feature points on said i-th image and the corresponding point on said (i+1)-th image found in said step b.

19. The image synthesizer according to claim 18, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

20. The image synthesizer according to claim 19, wherein in said step of extracting said overlapped portion of said i-th image and said (i+1)-th image, said overlapped portion of said i-th image and said (i+1)-th image is extracted on the basis of the Sum of Squared Differences method.

21. The image synthesizer according to claim 18, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

22. An image synthesizer for synthesizing three or more images from a first image to a n-th image (n is an integer of not less than three), with said first image as a reference image, comprising:

first means for finding transformations for finding a position on an i-th image corresponding to each of points on an (i+1)-th image, taking i as each of integers from 1 to (n−1);

second means for finding, for each of images from a second image to said n-th image, a transformation for finding a position on said first image corresponding to each of points on each of said second to n-th images, on the basis of said transformations found by said first means; and third means for performing such processes as synthesizing said first image and said second image on the basis of said transformation for finding the position on said first image corresponding to each of the points on said second image and synthesizing said third image and the synthesized image of said first and second images on the basis of said transformation for finding the position on said first image corresponding to each of the points on said third image, and continuing such processes up until said n-th image and the synthesized image of said first to (n−1)-th images are synthesized on the basis of said transformation for finding the position on said first image corresponding to each of the points on said n-th image, thereby to obtain the synthesized image of said first to n-th images, wherein said first means repeats the following steps a to c, by updating i by 1 from i=1 up to i=(n−1):

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and step c of finding a transformation for finding a position on said i-th image corresponding to each of points on said (i+1)-th image on the basis of each of said feature points on said i-th image and the c corresponding point on said (i+1)-th image found in said step b.

23. The image synthesizer according to claim 22, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

24. The image synthesizer according to claim 23, wherein in said step of extracting said overlapped portion of said i-th image and said (i+1) image, said overlapped portion of said i-th image and said (i+1)-th image is extracted on the basis of the Sum of Squared Differences method.

25. The image synthesizer according to claim 22, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

26. A computer readable recording medium on which an image synthesis program for synthesizing a first image and a second image is recorded, wherein said image synthesis program has a computer execute the following steps of the first step of extracting from said first image a plurality of partial images which are effective for tracking by optical flow between said first image and said second image, as feature points;

the second step of tracking a point on said second image corresponding to each of said feature points on said first image, on the basis of said optical flow between said two images;

the third step of finding a transformation for finding, on the basis of each of said feature points on said first image and the corresponding point on said second image which is found in said second step, a position on said second image corresponding to each of points on said first image, or a position on said first image corresponding to each of points on said second image; and the fourth step of synthesizing said first image and said second image such that the corresponding points on said first image and said second image coincide with each other on the basis of said obtained transformation.

27. The computer readable recording medium according to claim 26, wherein said first step comprises the steps of extracting an overlapped portion of said first image and said second image, and extracting from said overlapped portion with said second image, on said first image, a plurality of said partial images which are effective for tracking by said optical flow between said two images, as said feature points.

28. The computer readable recording medium according to claim 27, wherein in said step of extracting said overlapped portion of said first image and said second image, said overlapped portion of said first image and said second image is extracted on the basis of the Sum of Squared Differences method.

29. The computer readable recording medium according to claim 26, wherein said second step comprises the steps of finding said optical flow from said first image and said second image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said second image corresponding to each of said feature points on said first image, on the basis of said obtained optical flow.

30. A computer readable recording medium on which an image synthesis program for synthesizing, from three or more images from a first image to a n-th image (n is an integer of not less than three), said first image and said n-th image, with said first image as a reference image, is recorded, wherein said image synthesis program has a computer execute the following steps of the first step of finding transformations for finding a position on an i-th image corresponding to each of points on an (i+1)-th image, taking i as each of integers from 1 to (n−1);

the second step of finding a transformation for finding a position on said first image corresponding to each of points on said n-th image, on the basis of all of said transformations found in said first step; and the third step of synthesizing said first image and said n-th image such that the corresponding points of said first image and said n-th image coincide with each other, on the basis of said obtained transformation;

wherein said first step repeats the following steps a to c, by updating i by 1 from i=1 up to i=(n−1):

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and step c of finding a transformation for finding a position on said i-th image corresponding to each of points on said (i+1)-th image on the basis of each of said feature points on said i-th image and the corresponding point on said (i+1)-th image found in said step b.

31. The computer readable recording medium according to claim 30, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

32. The computer readable recording medium according to claim 31 wherein in said step of extracting said overlapped portion of said i-th image and said (i+1)-th image, said overlapped portion of said i-th image and said (i+1)-th image is extracted on the basis of the Sum of Squared Differences method.

33. The computer readable recording medium according to claim 30, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

34. A computer readable recording medium on which an image synthesis program for synthesizing, from three or more images from a first image to a n-th image (n is an integer of not less than three) said first image and said n-th image , with said first image as a reference image, is recorded, wherein said image synthesis program has a computer execute the following steps of the first step of finding transformations for finding a position on an i-th image corresponding to each of points on an (i+1)-th image, taking i as each of integers from 1 to (n−1);

the second step of finding, for each of images from said second image to said n-th image, a transformation for finding a position on said first image corresponding to each of points on each of said second to n-th images, on the basis of said transformations found in said first step; and the third step of performing such processes as synthesizing said first image and said second image on the basis of said transformation for finding the position on said first image corresponding to each of the points on said second image and synthesizing said third image and the synthesized image of said first and second images on the basis of said transformation for finding the position on said first image corresponding to each of the points on said third image, and continuing such processes up until said n-th image and the synthesized image of said first to (n−1)-th images are synthesized on the basis of said transformation for finding the position on said first image corresponding to each of the points on said n-th image, thereby to obtain the synthesized image of said first to n-th images, wherein said first step repeats the following steps a to c, by updating i by 1 from i=1 up to i=(n−1):

step a of extracting from said i-th image a plurality of partial images which are effective for tracking by optical flow between said i-th image and said (i+1)-th image, as feature points;

step b of tracking a point on said (i+1)-th image corresponding to each of said feature points on said i-th image on the basis of said optical flow between said two images; and step c of finding a transformation for finding a position on said i-th image corresponding to each of points on said (i+1)-th image on the basis of each of said feature points on said i-th image and the corresponding point on said (i+1)-th image found in said step b.

35. The computer readable recording medium according to claim 34, wherein said step a comprises the steps of extracting an overlapped portion of said i-th image and said (i+1)-th image, and extracting from said overlapped portion with said (i+1)-th image on said i-th image a plurality of said partial images which are effective for tracking by said optical flow between said two images, as said feature points.

36. The computer readable recording medium according to claim 35, wherein in said step of extracting said overlapped portion of said i-th image and said (i+1)-th image, said overlapped portion of said i-th image and said (i+1)-th image is extracted on the basis of the Sum of Squared Differences method.

37. The computer readable recording medium according to claim 34, wherein said step b comprises the steps of finding said optical flow from said i-th image and said (i+1)-th image on the basis of an optical flow estimation method using the hierarchically structured Lucas-Kanade method for interpolating optical flow having low confidence out of optical flows obtained in the respective stages of said optical flow estimation method using optical flow in its surrounding regions, and tracking the point on said (i+1)-th image corresponding to each of said feature points on said i-th image, on the basis of said obtained optical flow.

38. A digital camera with a function of synthesizing a first image and a second image, comprising:

first means for extracting from said first image a plurality of partial images which are effective for tracking by optical flow between said first image and said second image, as feature points;

second means for tracking a point on said second image corresponding to each of said feature points on said first image, on the basis of said optical flow between said two images;

third means for finding a transformation for finding, on the basis of each of said feature points on said first image and the corresponding point on said second image which is found by said second means, a position on said second image corresponding to each of points on said first image, or a position on said first image corresponding to each of points on said second image; and fourth means for synthesizing said first image and said second image such that the corresponding points on said first image and said second image coincide with each other, on the basis of said obtained transformation.

39. A printer with a function of synthesizing a first image and a second image, comprising:

first means for extracting from said first image a plurality of partial images which are effective for tracking by optical flow between said first image and said second image, as feature points;

second means for tracking a point on said second image corresponding to each of said feature points on said first image, on the basis of said optical flow between said two images;

third means for finding a transformation for finding, on the basis of each of said feature points on said first image and the corresponding point on said second image which is found by said second means, a position on said second image corresponding to each of points on said first image, or a position on said first image corresponding to each of points on said second image; and fourth means for synthesizing said first image and said second image such that the corresponding points on said first image and said second image coincide with each other, on the basis of said obtained transformation.

* * * * *